Sept. 12, 1967 R. PARAIN 3,340,604
METHOD OF SECURING STACKED PARTS OF A LOUDSPEAKER
Filed Sept. 1, 1964 3 Sheets-Sheet 1

INVENTOR.
ROLAND PARAIN
BY
AGENT

United States Patent Office 3,340,604
Patented Sept. 12, 1967

3,340,604
METHOD OF SECURING STACKED PARTS OF A LOUDSPEAKER
Roland Parain, Amandiers-Nanterre, France, assignor to North American Philips Company, Inc., New York, N.Y., a corporation of Delaware
Filed Sept. 1, 1964, Ser. No. 393,544
Claims priority, application France, Sept. 2, 1963, 946,305
2 Claims. (Cl. 29—594)

ABSTRACT OF THE DISCLOSURE

This disclosure relates to a method for assembling the magnetic pot, pole plate and conical supporting frame of a loudspeaker wherein the magnetic pot and pole plate are inserted into a truncated conical structure at the base of the supporting frame and held in position by deforming the supporting frame adjacent the truncated conical structure.

---

The object of the invention is to provide simple means for rigidly securing together at least two parts stacked on one another within an envelope by providing the envelope with grooves at several points located above the upper part of the stack.

The method according to the invention provides distinct advantages when securing a magnetic circuit of a loudspeaker to the support cone for the diaphragm of a loudspeaker.

It is known that an electrodynamic loudspeaker comprises a magnetic system and a diaphragm which is movably supported in a speaker cone. FIGURE 1 of the accompanying drawing shows such a device of known type comprising a magnet 1, placed in a pot-like part 2 which is closed by means of an upper plate 3. The parts 2 and 3 are usually made of soft iron and constitute a magnetic circuit. The gap between the upper plate 3 and the magnet 1 contains a coil 4 through which flows a low-frequency current. The sensitivity of the loudspeaker depends upon the total magnetic field in which the movable coil 4 is situated and the gap must therefore be as small as possible.

The lower side of the diaphragm 5 is movably secured to a supporting cone and the pot 2 is joined to the supporting cone 6.

The coil 4 is mounted on a rigid part 7, that is to say a cardboard or plastic cylinder, which is mechanically integral with the diaphragm of the speaker. The diaphragm and the coil are centred by means of a wafer-shaped or perforated part 8 of paper, textile or plastics, which is secured to the diaphragm, at the junction thereof with the part carrying the movable coil, and to the conical support 6.

The above mentioned parts have hitherto been assembled in different ways.

For example, the upper plate 3 was riveted on the cone 6 and the pot 2 was secured to the upper plate 3 by welding, flanging or riveting. The pot 2 and the upper plate 3 have sometimes been connected together by means of an additional part, or the pot 2 has been adapted to be pushed with force on the upper plate 3. All these fastening means have the common disadvantage that the assembled parts are deformed.

Such deformation is avoided in the present invention and other advantages are obtained which appear from the use of the invention in a loudspeaker as will be described hereinafter with reference to the accompanying diagrammatic drawings, in which.

Figure 1:
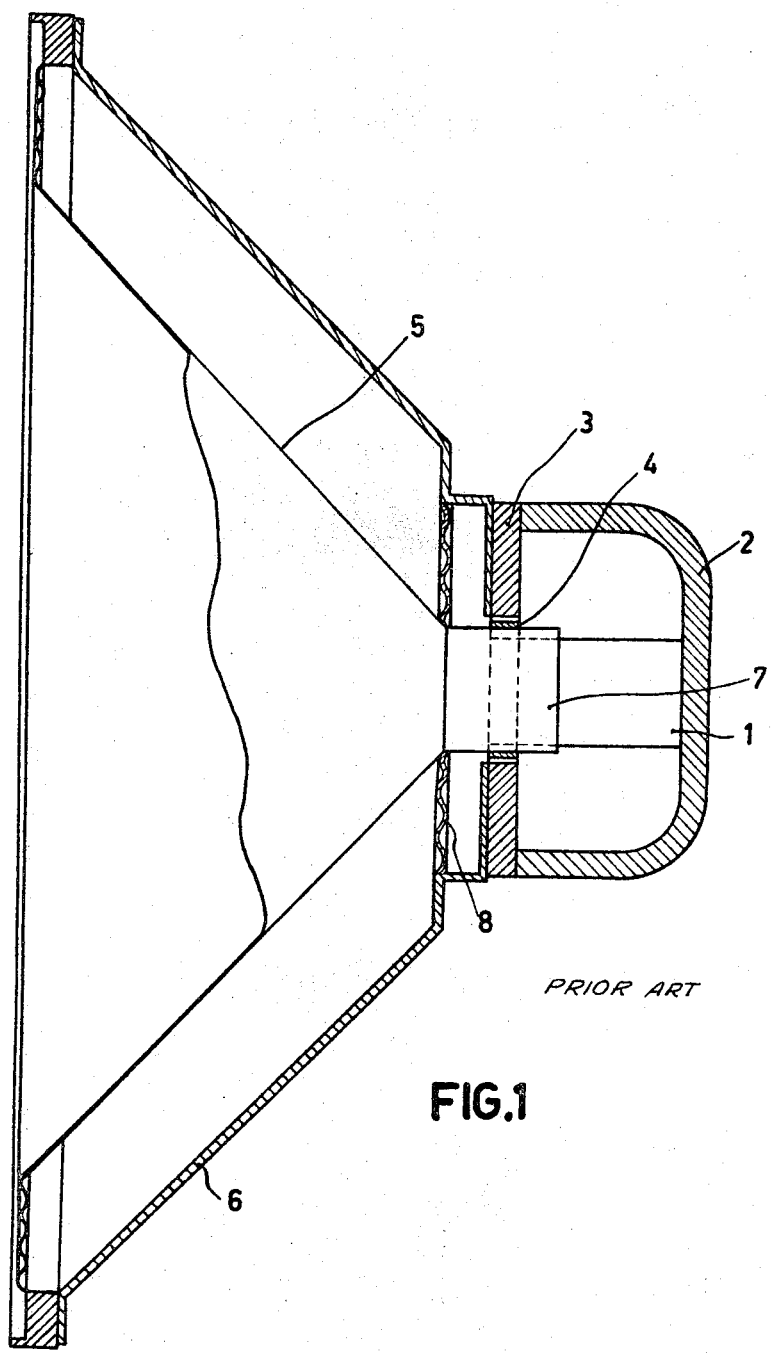
FIG. 1 shows an axial section of an electrodynamic loudspeaker of the known type.
Figure 2:
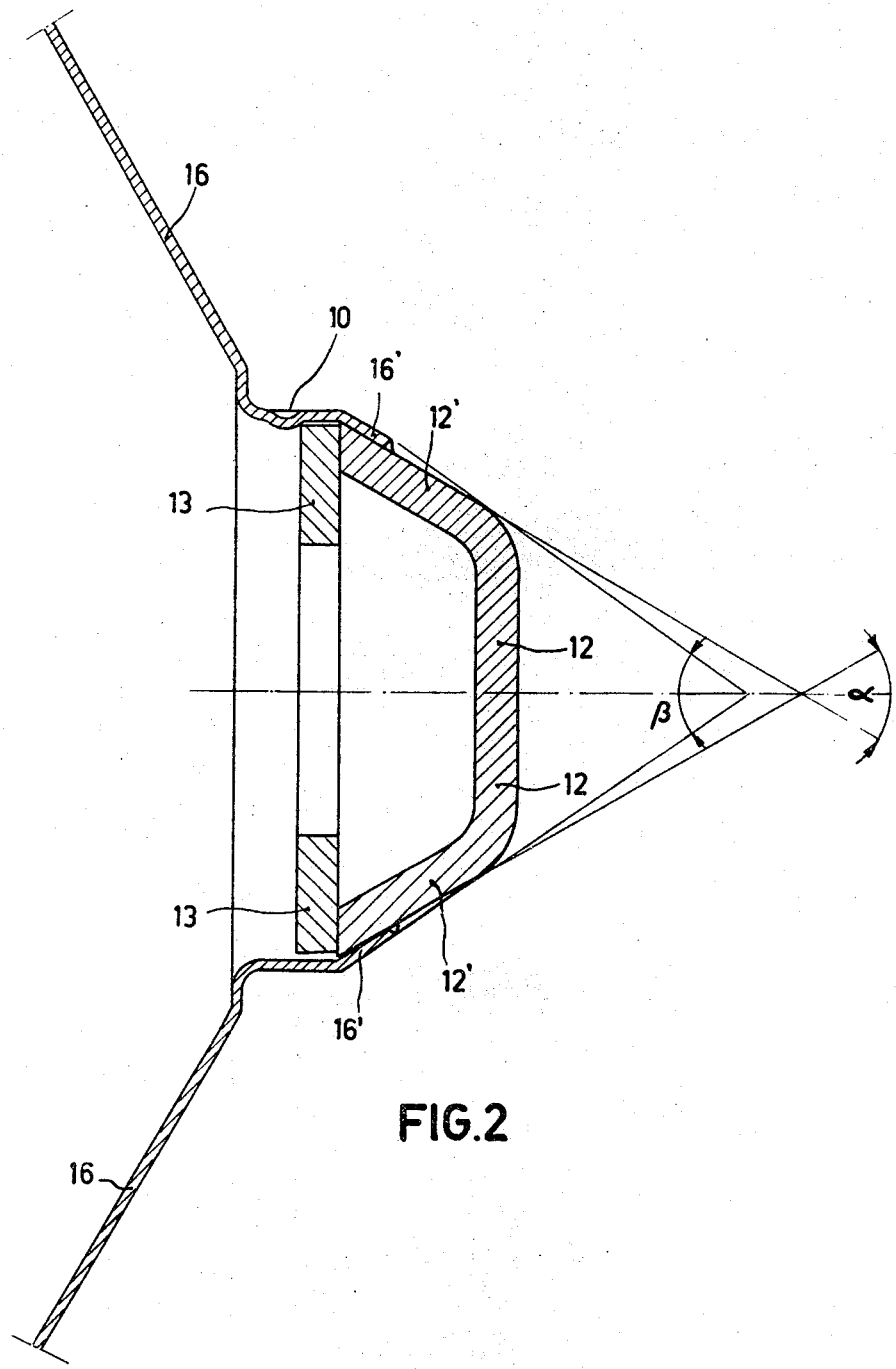
FIGS. 2 and 3 show the pot, the upper plate and the conical support interfitted, before and after assembling respectively, by means of the grooves according to the invention.
Figure 3:
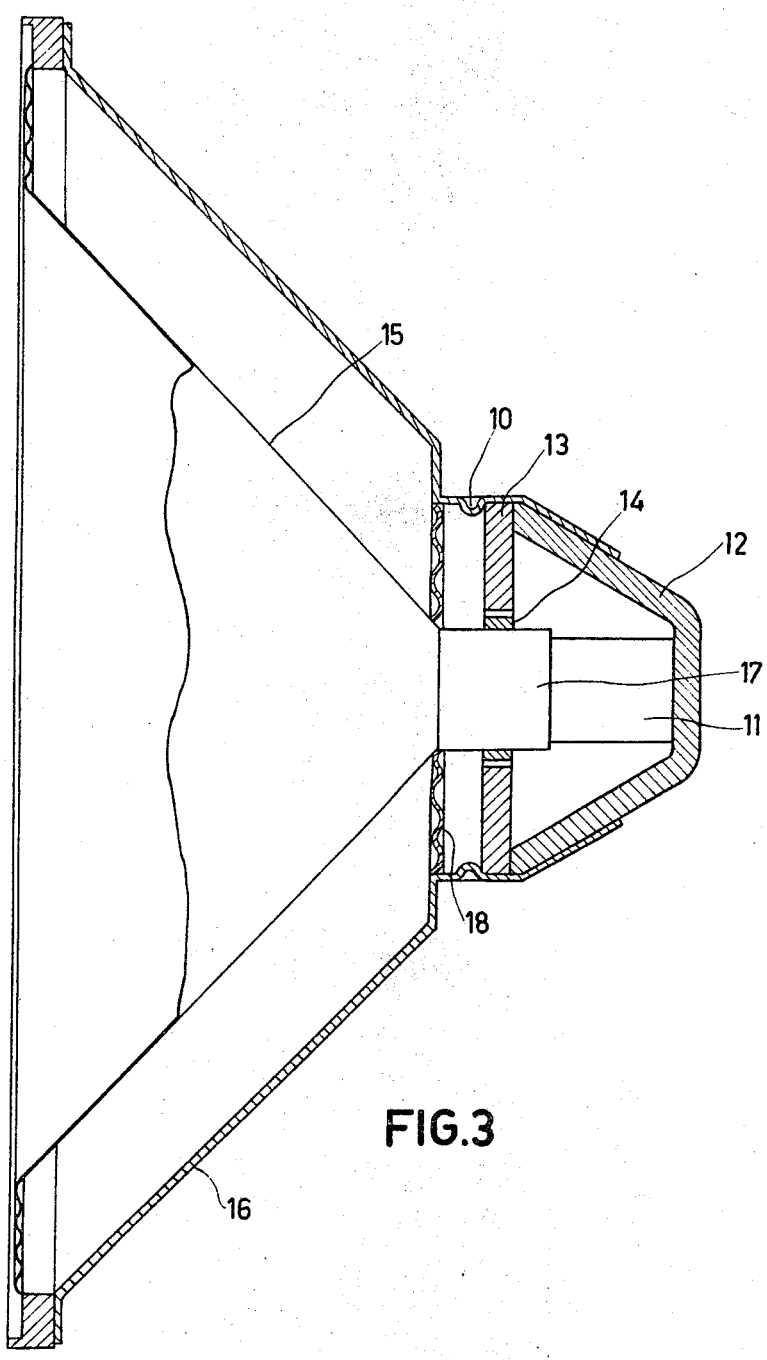

The invention substantially consists in securing an upper annular plate 13 to a magnetic pot 12, the conical support 16 being provided with grooves at suitable points, such as at 10 (FIG. 2). To this end, the lower portion of the conical support 16 will be shaped in the form of a truncated cone portion 16′ and the elements 12 and 13 will be given the dimensions and angles shown in FIG. 2. As may be seen from FIG. 3, the upper plate 13 and the pot 12, after assembling, are clamped in the supporting diverging walls by forming grooves at 10, the cone 12′ of the pot 12 bearing on the truncated cone portion 16′ of the supporting cone 16.

In order to improve the securement and anchor the parts completely, the truncated cone 16′ is caused to fulfill the function of a spring by giving the apical angle $\alpha$ of the diverging walls 12′ a value which is a little less than that of the apical angle $\beta$ of truncated cone 16′. This arrangement, which forms part of the invention, has been found to be very efficient.

In one advantageous embodiment the upper plate 13 has a diameter of 50 mm., the apical angle $\alpha$ of 12′ in 60° and the apical angle $\beta$ of 16′ is 70°.

Assembly of the magnetic circuit parts 12 and 13 with the support cone 16, having the truncated cone portion 16′, is carried out by placing the walls 12′ of pot 12 concentrically within the truncated cone portion 16′. The plate 13 is then placed on top of the pot 12 and the parts 12 and 13 are pressed so that the portion 16′ snugly embraces the walls 12′. The force imparted for this pre-assembly has a predetermined value and when it has been reached the indentations or groove 10 are formed to make the final assembly of the parts 12 and 13 under a forced fit within the envelope defined by the truncated cone 16′. The force or pressure for intimately uniting 12′, 13 and and 16′ may be provided at the same time that the indentations 10 are formed as will be apparent from FIG. 2. When the latter method is utilized the formation of the grooves 10 is halted when the predetermined force for assembling parts 12, 13 and 16′, has been reached. In the embodiment shown, the grooves or indentations 10 are obtained by locating four to six balls around the periphery of the support 16 in a known manner and simultaneously pressing the balls radially inwardly. In the present embodiment balls of 4 mm. diameter were used to indent the 1 mm. sheet material of the support cone 16 up to a depth of 1 mm.

Dependent on the diameter of the magnet 11 (FIG. 3), the latter is placed in position in the pot 12 before or after the formation of the grooves. The magnet is fixed in position with the aid of an adhesive or a brass centering member secured to the upper plate or in any other known manner.

If the support 16 is made, for example, from aluminium sheet, use will preferably be made of a sheet coated with a plastic material as commercially sold. As an alternative, the conical support may be wholly made of plastics, namely by the extrusion process.

The method of fastening by means of the grooves according to the invention affords numerous advantages. Apart from the components not being deformed, it facilitates the assembly and reduces faulty manipulations. The absence of deformation is interesting, because the clearance between the coil 14 and the upper plate 13 (FIG. 3) is very small, that is to say of the order of 0.15 mm.

Further the described method of fastening may readily be carried out in mass production since the method of assembly is rapid and hence economic.

Lastly, the condition of the surfaces on which the grooves are formed is not modified by the above described method, so that it is possible to prepare the surface area of each component part prior to assembly, for example, painting, cadmium-plating, etc. In other methods of assembling, however, such as, for example, by welding or riveting, the whole must be cadmium-plated or painted after assembling, which involves great disadvantages with regard to oxidation.

The above cited embodiment is intended as exemplary only, and while I have described my invention with a specific application and embodiment thereof, other modifications will be apparent to those skilled in the art without departing from the spirit and scope of the invention as defined by the appended claims.

What is claimed is:

1. A method of assembling the magnetic pot, pole plate and supporting frame of a loudspeaker comprising the steps of forming a truncated conical portion defining an apical angle $\beta$ at one end of said loudspeaker frame member, forming a generally U shape magnetic pot part having a frusto-conical side wall portion defining an apical angle $\alpha$ which is less than said apical angle $\beta$, inserting said pot part concentrically within said truncated conical portion of said frame in an upright position so that said frusto-conical side wall portion engages said truncated portion, placing said pole plate within said truncated conical portion overlying the upright walls of said pot part, positioning said pot part and associated plate within said truncated portion to stress said truncated portion and deforming said truncated portion adjacent to said pole plate to hold said parts in said position.

2. A method according to claim 1 wherein said truncated portion is deformed by grooves formed by pressing inwardly at least three discrete areas of said truncated portion.

References Cited

UNITED STATES PATENTS

| | | | |
|---|---|---|---|
| 1,991,738 | 2/1935 | Gaubert | 179—115.5 X |
| 3,150,441 | 9/1964 | Kloss | 29—155.5 X |
| 3,191,421 | 6/1965 | Coen | 29—155.5 |

FOREIGN PATENTS

| | | |
|---|---|---|
| 828,555 | 2/1960 | Great Britain. |

JOHN F. CAMPBELL, *Primary Examiner.*

J. L. CLINE, *Assistant Examiner.*